Feb. 23, 1932. N. E. GARDINER ET AL 1,846,638

VALVE NUT AND INSIDES ASSEMBLING MACHINE

Filed Jan. 25, 1929

INVENTORS.
N. E. GARDINER.
G. B. NICHOLS.

Ely & Barrow
ATTORNEY.

Patented Feb. 23, 1932

1,846,638

UNITED STATES PATENT OFFICE

NELL E. GARDINER, OF CUYAHOGA FALLS, AND GEORGE B. NICHOLS, OF AKRON, OHIO, ASSIGNORS TO THE FIRESTONE TIRE & RUBBER COMPANY, OF AKRON, OHIO, A CORPORATION OF OHIO

VALVE NUT AND INSIDES ASSEMBLING MACHINE

Application filed January 25, 1929. Serial No. 334,994.

This invention relates to machines for use in the manufacture of inner tubes for pneumatic tires.

The modern method of manufacturing inner tubes comprises molding the rubber walls thereof in circular form within a vulcanizing mold or press and curing the tube stock about the valve stem placed therewith in the mold. When the vulcanizing operation is completed the inner tube is removed from the mold, the spreader or guard plate placed over the valve stem, and a nut run down on the valve stem to secure the latter and the spreader to the tube. The valve insides are also assembled within the stem and the tube inflated for testing.

The object of the present invention is to devise a simple and effective machine for simultaneously running down the outside valve stem nut upon the stem and assembling the valve insides therein. A further object is to provide means whereby a uniform compression of the outside nut and the valve insides may be obtained in order not to damage the tube or the valve insides by screwing the parts too tightly together.

The foregoing and other objects are obtained by the device illustrated in the accompanying drawings and described below. It is to be understood that the device is not limited to the specific form thereof disclosed herein.

In the accompanying drawings.

Figure 1:
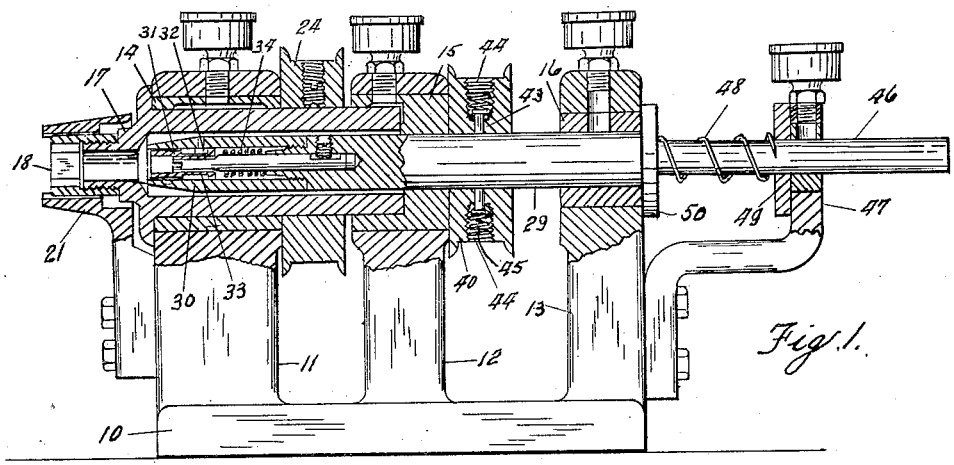
Figure 1 is a side elevation partly in section illustrating a machine embodying the principles of the invention.
Figure 2:
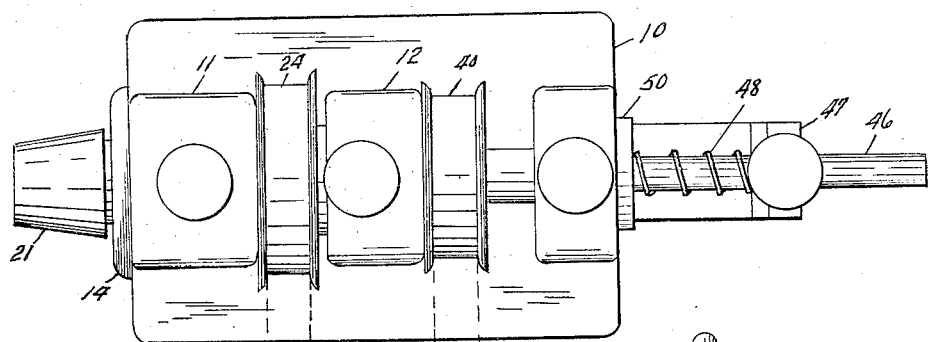
Figure 2 is a plan view thereof.

Referring in detail to the drawings, the numeral 10 denotes a base formed with standards 11, 12 and 13 provided at their upper ends with journal bushings 14, 15 and 16 respectively. Hollow shaft 17 is journalled within bushings 14 and 15 and has screwthreaded to its outer extremity a nut holder or wrench head 18 adapted to fit about the valve nut 19 to be threaded onto the valve stem 20. A collar 21 surrounding wrench head 18 is affixed to standard 11 and is provided with a slotted end for holding stationary during the assembly of the parts, the spreader 22 which is to be clamped against a tube 23 by nut 19. Shaft 17 is rotated through a pulley 24 driven by a belt 25 from pulley 26 keyed on shaft 27 of motor 28, the belt being loose enough so that it will slip about pulley 24 when nut 19 is securely threaded on the valve stem. Shaft 29 slidably and rotatably journalled in bushings 15 and 16 extends within a counterbore formed in hollow shaft 17 and has screwthreaded to its outer end a guide sleeve 30. Ferrule 31 is slidably mounted within sleeve 30 and its movement is limited by pin 32 projecting from sleeve 30 into an external groove 33 formed in ferrule 31. The latter is yieldingly held in its normal position by means of a coil spring 34 interposed between the ferrule and the end of shaft 29. A small tool 35 affixed in the outer end of shaft 29 is provided with a female screw driver head 36 adapted to engage lugs 37 formed on screw plug 38 of the usual tire valve insides 39 for threading the same within the valve stem.

Shaft 29 is provided with a pulley 40 driven by belt 41, in turn trained over a pulley 42 attached to motor drive shaft 27. Undue tightening of the valve insides within the valve stem is prevented by mounting pulley 40 on shaft 29 with only a slight frictional engagement provided between the members. This engagement is conveniently obtained by means of spring pressed friction pins 43 carried within the pulley and radially and yieldably reciprocable into engagement with shaft 29, the proper degree of friction being obtained by means of a screw plug 44 adjustably forcing spring 45 against pins 43. A reduced extension 46 on the end of shaft 29 is journalled within a bracket 47 mounted on standard 13 and a coil spring 48 confined between a washer 49 engageable with bracket 47 and a washer 50 engageable with the shoulder between the shaft 29 and its extension 46, yieldingly serves to maintain shaft 29 normally towards the left as viewed in Figure 1.

Figure 3:
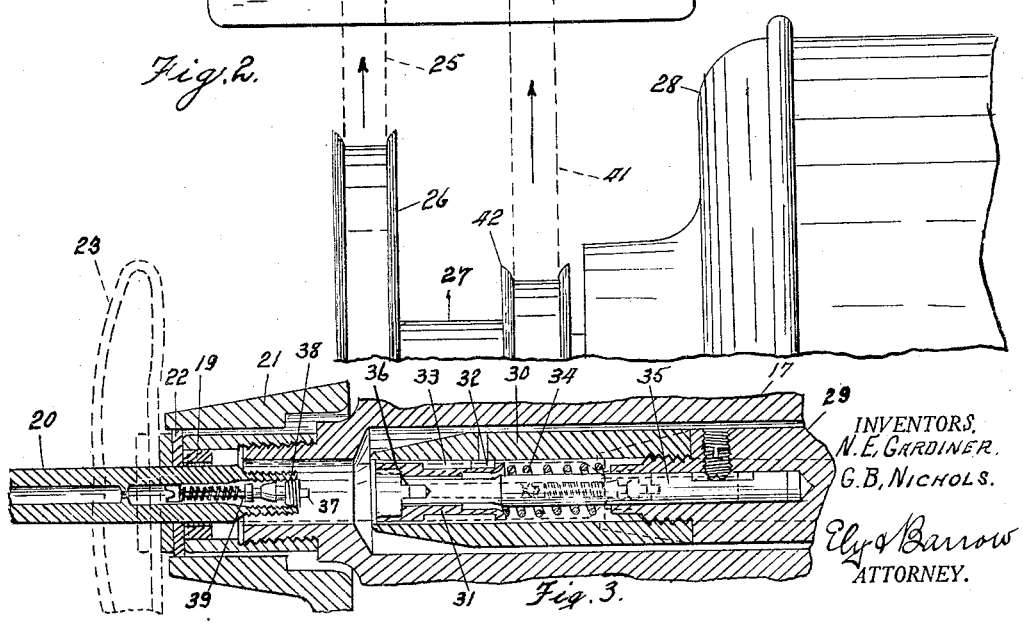
Figure 3 is an enlarged scale sectional detail illustrating the operation of the machine.

In the operation of the machine, nut 19 and valve insides plug 38 are first started within their respective threads by hand and the end of the valve stem placed within the bore of hollow shaft 17 until the nut engages within wrench head 18. Spreader 22 which was previously placed over the valve stem is placed within collar 21 and is held against rotation by the slotted end thereof, the spreader in turn holding the valve stem against rotation by means of the well known formation of flat sides formed in the central aperture thereof engageable with flat sides formed on the valve stem. Shafts 17 and 29 are continuously rotated and as soon as nut 19 engages nut head 18 the nut begins to run down on the threads of the valve stem as illustrated in Figure 3. This operation continues until lugs 37 engage screwdriver head 36 when plug 38 will also be run down into the internal screw threads of the valve stem.

Spring pressed sleeve 31 assists in guiding the end of the valve into proper relation with tool 35 and is gradually reciprocated against the action of the spring 34 during the threading of plug 38. A few turns suffice to run the valve insides securely into seating engagement within the valve stem. When a sufficiently tight engagement is obtained pulley 40 will begin to slip upon shaft 29 so that the latter ceases to rotate. Meanwhile nut 19 continues to run down on the external threads of the valve stem until it securely clamps spreader 22 against the tube 23 at which point belt 25 will begin to slip around pulley 24, the parts then being in the dotted line position shown in Figure 3 where shaft 29 will be reciprocated relatively away from the nut wrench head against the action of coil spring 48. The operator then pulls out on the valve stem which releases the nut and plug threading means and permits the assembled valve stem to be withdrawn from the machine. The valve nut and valve insides are thus quickly threaded into proper engagement by simultaneous operations and the adjustment of the drive pulleys is such that the valve insides and nut will not be too tightly threaded so as to result in damaged valve washers and tube walls.

Modifications of the invention may be resorted to without departing from the spirit thereof or the scope of the appended claims.

What is claimed is:

1. A machine for assembling valve nuts and insides with valve stems, comprising in combinaiton a rotatable valve insides screw plug driver, a rotatable valve nut wrench rotatably and reciprocably mounted with respect to said driver, means for rotating said driver and wrench, a clutch for the plug driver and a clutch for the wrench, and means for rotating both clutches, which clutches render the rotating means inoperative when a tight engagement of the valve nut and insides with the valve stem is obtained.

2. A machine for assembling valve nuts and insides with externally and internally threaded valve stems, comprising in combination a rotatable valve insides screw plug driver, a rotatable valve nut wrench coaxially, rotatably and reciprocably mounted with respect to said driver, means for rotating said coaxial driver and wrench for simultaneously running down the valve plug and valve nut on the internal and external threads, respectively, of the valve stem, a clutch for the plug driver and a clutch for the wrench, and means for rotating both clutches, which clutches render the rotating means inoperative when a tight engagement of the valve nut and insides with the valve stem is obtained.

In witness whereof we have hereunto affixed our signatures this 19th day of December, 1928.

NELL E. GARDINER.
GEORGE B. NICHOLS.